(12) United States Patent
Van Stralen

(10) Patent No.: US 6,940,927 B2
(45) Date of Patent: Sep. 6, 2005

(54) SIMPLIFIED SYMBOL TIMING TRACKING CIRCUIT FOR A CPM MODULATED SIGNAL

(75) Inventor: Nick A. Van Stralen, Bollston Lake, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 761 days.

(21) Appl. No.: 09/907,082

(22) Filed: Jul. 17, 2001

(65) Prior Publication Data

US 2003/0031277 A1 Feb. 13, 2003

(51) Int. Cl.⁷ .................................................. H03D 1/00
(52) U.S. Cl. ....................................... 375/340; 375/265
(58) Field of Search ................................. 375/340, 341, 375/229, 233, 265, 326, 327, 358, 371; 325/361, 265, 262; 714/792, 794, 795, 796

(56) References Cited

U.S. PATENT DOCUMENTS

| | | | | | |
|---|---|---|---|---|---|
| 4,578,800 | A | * | 3/1986 | Yasuda et al. | 375/354 |
| 5,325,402 | A | * | 6/1994 | Ushirokawa | 375/341 |
| 5,471,501 | A | * | 11/1995 | Parr et al. | 375/354 |
| 5,910,968 | A | | 6/1999 | Chouly et al. | |
| 6,034,997 | A | | 3/2000 | Mackenthun | |
| 6,493,409 | B1 | * | 12/2002 | Lin et al. | 375/375 |

* cited by examiner

*Primary Examiner*—Emmanuel Bayard
(74) *Attorney, Agent, or Firm*—Scully, Scott, Murphy & Presser

(57) ABSTRACT

A symbol epoch tracking circuit and method for a Continuous Phase Modulation (CPM) receiver. A phase tracking circuit performs carrier phase tracking with little extra computation for a Viterbi decoder and has an excellent tracking performance. The symbol epoch tracking circuit is implemented in a CPM receiver, and could also be implemented as a software defined process for use in any CPM demodulator employing a Viterbi algorithm for accurate data detection.

13 Claims, 3 Drawing Sheets

Reduced Complexity Symbol Timing Estimator

SIMPLIFIED SYMBOL TIMING TRACKING CIRCUIT FOR A CPM MODULATED SIGNAL

BACKGROUND OF THE INVENTION

Field of the Invention

The present invention pertains generally to continuous wave modulation, and more particularly relates to a reduced complexity tracking algorithm for the symbol timing synchronization of a continuous phase modulation (CPM) input data signal using a Viterbi algorithm for demodulation.

Continuous phase modulation (CPM) is a modulation format which generates a constant envelope signal and which possesses advantageous spectral properties. CPM has found utility in systems where it is desirable to use a constant envelope modulation, such as where high power nonlinear amplifiers are used. The constant envelope constraint introduces memory at the transmitter, effectively making a CPM signal more difficult to detect. Typically a Viterbi algorithm is used to perform sequence detection on the received symbol sequence. In order to compute the proper branch metric signals required in the Viterbi algorithm, the receiver must have an accurate estimate of the phase of the transmitter's symbol clock signal with respect to the received signal. This is known as symbol timing synchronization. The present invention describes a reduced complexity-tracking algorithm for the symbol timing synchronization of a CPM modulated signal where the Viterbi algorithm is used for demodulation.

Trellis decoders or demodulators are frequently used to demodulate signals modulated by continuous phase modulation (CPM). In the context of the present invention, coding/decoding and modulation/demodulation are analogous, and may be viewed as corresponding. CPM modulation has an advantage of providing a signal having substantially constant power, which is a marked advantage when transmitting the modulated signals over a nonlinear channel, as the constant power tends to reduce the generation in such a channel of unwanted distortion products which obscure the signals. A further advantage of CPM modulation is that the bandwidth of the transmitted signal is easily maintained, and the frequency spectrum exhibits low sidelobes, which is advantageous for situations in which a plurality of signals traverse a channel, as the signal spectrum for one of the signals traversing the channel has little frequency overlap with the signal next adjacent in frequency. In other words, the channels may be closer together in frequency.

CPM modulation is performed, in general, by converting the information or signal to m-ary quantized form, if not already in the desired form. For the simple case in which m=2, the signal is converted into binary form. The m-ary signal is applied to a shift register array having a particular length. As the signal bits are applied to the input end of the shift register array, the previously-applied signals are clocked and propagate through the shift register array, altering the states of the registers in succession. A combinatorial or functional logic arrangement is coupled to the output of each register of the array, and applies some function to the combination of register logic states. The applied function results in one or more output signals, which depend upon the combinatorial function, and also depend upon the current state of each register in the array. The current state of each register in the array in turn depends upon the history of the input signal.

The demodulation of a signal modulated in the above-described fashion can be accomplished by a trellis demodulator. The "trellis" represents, by "nodes", the possible states of the registers of the modulator, and by lines joining the nodes, the possible paths by which transitions between states can be made. The trellis demodulator is often implemented as a Viterbi algorithm which performs sequence detection on the received symbol sequence. Demodulation using a Viterbi algorithm requires an accurate estimate of the phase of the transmitter's symbol clock signal with respect to the received signal. The process of obtaining an accurate estimate of the phase of the transmitter's symbol clock signal with respect to the received signal is known as symbol timing synchronization.

SUMMARY OF THE INVENTION

It is therefore an object of the present invention to provide a method of and apparatus for accurately estimating the timing of a transmitter's symbol clock signal with respect to a received signal.

It is another object of the present invention to realize a new symbol epoch tracking circuit for CPM receivers which overcomes the shortcomings of prior art conventional CPM receivers.

To that end, a symbol epoch tracking circuit performs symbol epoch tracking with minimal extra computation for a Viterbi decoder using a Viterbi algorithm and with excellent tracking performance.

The symbol epoch tracking circuit is implemented in a CPM receiver, and could also be implemented as a software defined process for use in any CPM demodulator employing a Viterbi algorithm for accurate data detection.

DETAILED DESCRIPTION OF THE INVENTION

Figure 1:
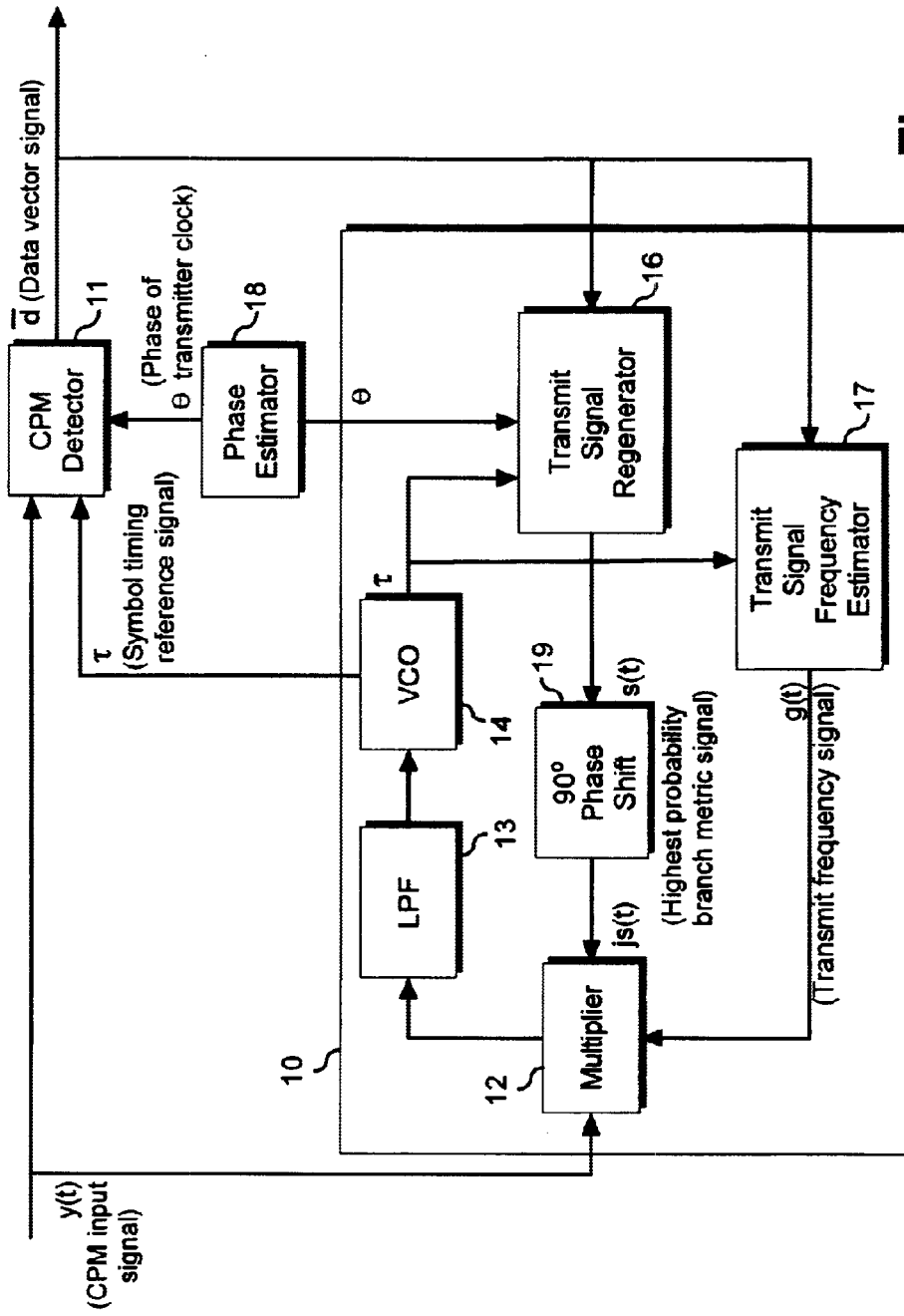
FIG. 1 is a simplified block diagram of a maximum likelihood symbol timing estimator which functions in accordance with the teachings of the present invention.

A maximum likelihood estimator for the transmitted symbol timing epoch can be derived using maximum likelihood theory.

An appropriate likelihood function $L(t, \theta, \tau, \bar{d})$ for estimating the symbol timing epoch in a CPM demodulator is defined by equation (1):

$$L(t, \theta, \tau, d) = C \exp\left\{-\frac{1}{N_o} \int_{T_o} (y(t) - s(t, \theta, \tau, d))^2 dt\right\} \quad (1)$$

where $N_0$ is the noise power, $T_0$ is the observation interval, $y(t)$ is the received signal, C is a constant responsive to the amplitude of the received signal, and $s(t, \theta, \tau, \bar{d})$ is the transmitted signal. The parameters of the transmitted signals are $\theta$, the carrier phase, $\tau$, the symbol timing reference, and $\bar{d}$, the transmitted data sequence. $\bar{d}$ is a vector and is referred to herein as d or $\bar{d}$. Taking logarithms and expanding the squared term in equation (1) gives the log-likelihood function as set forth in equation (2):

$$l(t, \theta, \tau, \overline{d}) = \qquad (2)$$

$$\ln(C) - \frac{1}{N_o} \int_{T_o} (s(t, \theta, \tau, d))^2 + (y(t))^2 - 2y(t)s(t, \theta, \tau, d)dt$$

The constant first term of equation (2) and the second term within the integral of equation (2) are independent of the parameter τ and may be dropped. For a constant envelope scheme such as CPM, the first term within the integral of equation (2) is also independent of the carrier phase reference θ. The equivalent log-likelihood function to be maximized is therefore given by equation (3):

$$l(t, \theta, \tau, d) = \frac{1}{N_o} \int_{T_o} 2y(t)s(t, \theta, \tau, d)dt \qquad (3)$$

A necessary condition for a maximum of the equivalent log-likelihood function of equation (3) is that the derivative be zero at the maximum. Differentiating equation (3) with respect to the symbol timing reference, τ, and setting the result equal to zero, gives likelihood equation (4) for the estimation of the symbol timing epoch.

$$0 = \frac{2}{N_o} \int_{T_o} y(t) \frac{\partial s(t, \theta, \tau, \overline{d})}{\partial \tau} dt \qquad (4)$$

The transmitted signal in a CPM arrangement can be expressed as s(t, θ, τ, d) in equation (5):

$$s(t, \theta, \tau, d) = \operatorname{Re}\left[\left(\frac{2E}{T}\right)^{1/2} \qquad (5)\right.$$

$$\left. \exp\left(j\left(\omega_o(t+\tau) + \theta + \pi\left(\sum_{i=-\infty}^{n-L} d_i h\right) + 2\pi \sum_{i=n-L+1}^{n} d_i h q(t-iT+\tau)\right)\right)\right]$$

where $\overline{d}$ is the data vector, E is the transmit energy, T is the symbol period, $\omega_0$ is the carrier frequency, and $\overline{d}=(d_-, d_{n-2}, d_{n-1}, d_n)$ is the transmit information or data sequence. In equation (5), the parameter q(t−iT+τ) is the phase pulse, L is the duration of the phase pulse, and h is the modulation index. Substituting the definition of the transmitted signal of equation (5) into the partial derivative of equation (4) one obtains equation (6):

$$\frac{\partial s(t, \theta, \tau, \overline{d})}{\partial \tau} = \operatorname{Re}\left[j\left(\frac{2E}{T}\right)^{1/2} 2\pi \sum_{i=n-L+1}^{n} d_i h \frac{\partial q(t-iT+\tau)}{\partial \tau}\right. \qquad (6)$$

$$\left. \exp\left(j\left(\omega_o(t+\tau) + \theta + \pi\left(\sum_{i=-\infty}^{n-L} d_i h\right) + 2\pi \sum_{i=n-L+1}^{n} d_i h q(t-iT+\tau)\right)\right)\right]$$

Ignoring the constants, the likelihood equation associated with equation (6) is equation (7):

$$0 = \int_{T_o} \operatorname{Re}\left[jy(t) \sum_{i=n-L+1}^{n} d_i \frac{\partial q(t-iT+\tau)}{\partial \tau} \exp\left(j\left(\omega_o(t+\tau) + \theta + \right.\right.\right. \qquad (7)$$

-continued $$\left.\left.\left.\pi\left(\sum_{i=-\infty}^{n-L} d_i h\right) + 2\pi \sum_{i=n-L+1}^{n} d_i h q(t-iT+\tau)\right)\right)\right] dt$$

The derivative of the phase pulse q(t) with respect to the symbol timing epoch is equal to the frequency pulse g(t) so that:

$$0 = \qquad (8)$$

$$\int_{T_o} \operatorname{Re}\left[jy(t) \sum_{i=n-L+1}^{n} d_i g(t-iT+\tau) \exp\left(j\left(\omega_o(t+\tau) + \theta + \pi\left(\sum_{i=-\infty}^{n-L} d_i h\right) + \right.\right.\right.$$

$$\left.\left.\left. 2\pi \sum_{i=n-L+1}^{n} d_i h q(t-iT+\tau)\right)\right)\right] dt$$

To derive a structure from the above equation, we can make a few assumptions. The data sequence vector d, and the carrier transmit phase, θ, are not known to the receiver. However, if the receiver is in a tracking mode so that carrier tracking errors are small, and the signal to noise ratio is high enough so that the detected data sequence is usually correct, then the receiver's estimates can be substituted for these parameters. The right hand side of equation (8) can then be used as an error signal to correct the current estimate of the symbol timing epoch reference. Furthermore, the term:

$$\operatorname{Re}\left[j \exp\left(j\left(\omega_o(t+\hat{\tau}) + \theta + \pi\left(\sum_{i=-\infty}^{n-L} \hat{d}_i h\right) + 2\pi \sum_{i=n-L+1}^{n} \hat{d}_i h q(t-iT+\hat{\tau})\right)\right)\right] \qquad (9)$$

is just the receiver's estimate of the transmitted signal phase shifted by 90°.

FIG. 1 is a simplified block diagram of a Maximum Likelihood (ML) symbol timing estimator 10 which functions in accordance with equations (1)–(9). An input signal y(t) is provided to a CPM detector 11 and a multiplier 12. The multiplier 12 multiplies the input signal y(t) with js(t), a regenerated transmit signal s(t) produced by a transmit signal regenerator 16 which is shifted by 90° through a phase shifter 19 and g(t), the transmit frequency signal. The output of the multipier 12 is passed through a low pass filter (LPF) 13 to provide an input control signal for a VCO 14. The VCO 14 provides an output symbol timing reference signal τ to the CPM detector 11, to the transmit signal regenerator 16, and to the transmit signal frequency estimator 17.

Based upon the tracking mode receiver as explained above, a phase estimator 18 provides a phase signal θ to the CPM detector 11 and also to the transmit signal regenerator 16. The CPM detector 11 outputs a vector signal d to both the transmit signal regenerator 16 and the transmit frequency estimator 17.

Much of the complexity in the Maximum Likelihood (ML) symbol timing tracking circuit of FIG. 1 is due to complexities of the transmit signal regenerator 16 and the multiplier 12. A reduced complexity symbol timing estimation algorithm can be implemented which operates with a CPM signal that is demodulated using the Viterbi algorithm. The maximum likelihood symbol timing estimator performs a correlation similar to the correlation performed to compute the branch metric signals of the Viterbi algorithm. The branch metric signals in the trellis of the CPM signal are computed using $$\lambda(\hat{a},m) = \int_{t=mT}^{mT+1} y(t) \text{Re}\left[\exp\left(j\left(\omega_o(t+\tau) + \theta + \pi\left(\sum_{i=-\infty}^{m-L} d_i h\right) + 2\pi \sum_{i=m-L+1}^{m} d_i hq(t-iT+\tau)\right)\right)\right] dt \quad (10)$$

A distinct branch metric signal is computed for each branch of the trellis. We now define $$\Theta_{m-L} = \pi\left(\sum_{i=-\infty}^{m-L} d_i h\right) \quad (11)$$

as a phase state of the branch, and $$a_m = (d_{m-L+1}, d_{m-L+2}, \ldots d_m) \quad (12)$$

as the correlative state of the branch. There are usually more than two distinct phase states, so that the computation of the branch metric signals for the same correlative state can be performed by using a complex correlator for the correlative state, and then by applying a phase rotation of this complex value to obtain the branch metric signal for each phase state. Two correlators compute the values.

$$\lambda_I(d,m) = \int_{t=mT}^{mT+1} y(t) \text{Re}\left[\exp\left(j\left(\omega_o(t+\tau) + \theta + 2\pi \sum_{i=m-L+1}^{m} d_i hq(t-iT+\tau)\right)\right)\right] dt \quad (13)$$

and $$\lambda_Q(d,m) = \int_{t=nT}^{nT+1} y(t) \text{Re}\left[j\exp\left(j\left(\omega_o(t+\tau) + \theta + 2\pi \sum_{i=m-L+1}^{m} d_i hq(t-iT+\tau)\right)\right)\right] dt \quad (14)$$

The computed values are multiplied by a complex number representing each of the possible values of equation 11. The real component after this multiplication is the desired branch metric signal of equation 10. The complex component is normally discarded. The complex component is defined as Q (a,m) and is $$Q(a,m) = \int_{t=mT}^{mT+1} y(t) \text{Re}\left[j\exp\left(j\left(\omega_o(t+\tau) + \theta + \pi\left(\sum_{i=-\infty}^{m-L} d_i h\right) + 2\pi \sum_{i=m-L+1}^{m} d_i hq(t-iT+\tau)\right)\right)\right] dt \quad (15)$$

To facilitate the description of this reduced complexity timing epoch estimator, the error signal for estimation of the timing epoch is rewritten as $$\tau_{err} = \int_{T_o} \sum_{i=m-L+1}^{m} \hat{d}_i g(t-iT+\hat{\tau}) \quad (16)$$

$$\text{Re}\left[jy(t)\exp\left(j\left(\omega_o(t+\hat{\tau}) + \hat{\theta} + \pi\left(\sum_{i=-\infty}^{m-L} \hat{d}_i h\right) + 2\pi \sum_{i=m-L+1}^{m} \hat{d}_i hq(t-iT+\hat{\tau})\right)\right)\right] dt$$

Equation 16 can be simplified by assuming that the first summation is constant over a T symbol period so that the error signal can be separated into two terms. Then the error signal is approximated as $$\tau_{err} \approx \left[\sum_{i=m-L+1}^{m} \hat{d}_i g(t-iT+\hat{\tau})\right] \quad (17)$$

$$\int_{t=mT}^{mT+1} \text{Re}\left[jy(t)\exp\left(j\left(\omega_o(t+\hat{\tau}) + \hat{\theta} + \pi\left(\sum_{i=-\infty}^{m-L} \hat{d}_i h\right) + 2\pi \sum_{i=m-L+1}^{m} \hat{d}_i hq(t-iT+\hat{\tau})\right)\right)\right] dt$$

The integral term is the quantity Q (a,m) introduced above, and is computed in the branch metric signal calculations in the Viterbi algorithm.

Figure 2:
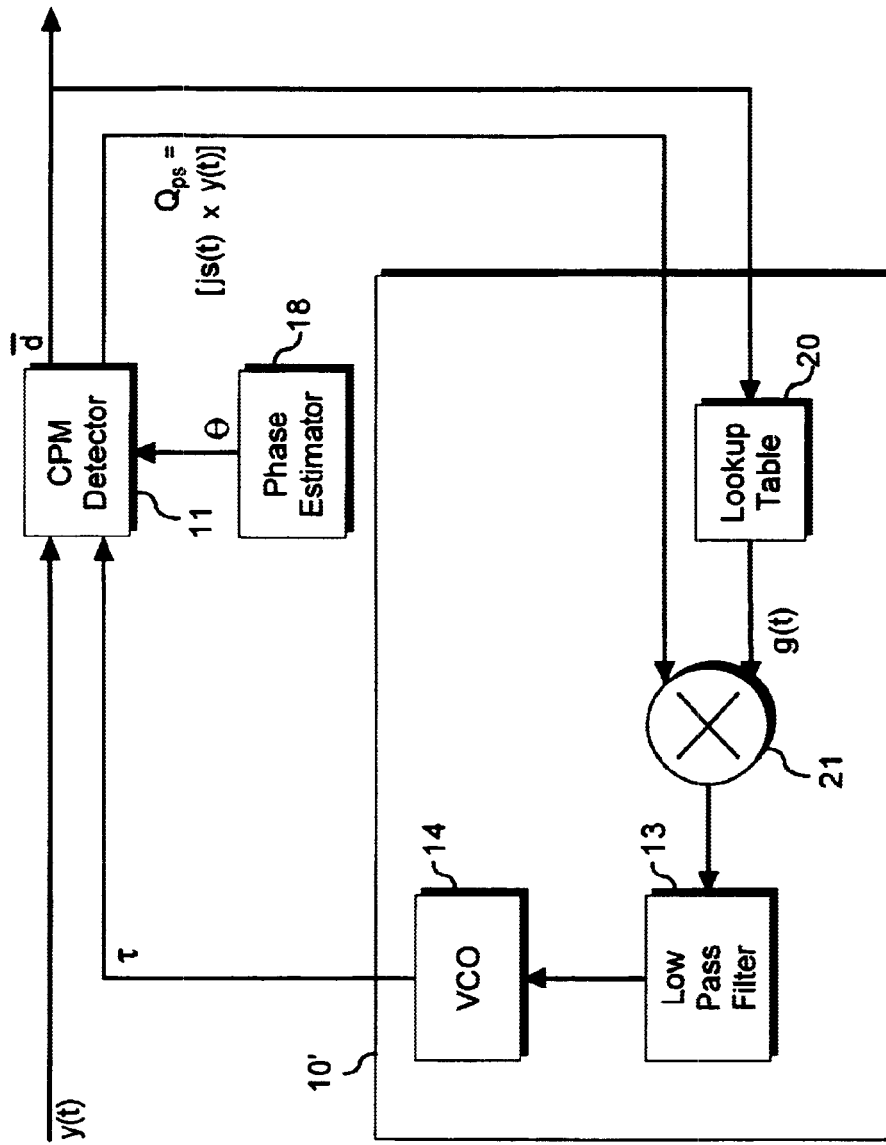
FIG. 2 is a simplified block diagram of a maximum likelihood symbol timing estimator of reduced complexity wherein a summation term is implemented as a lookup table.

FIG. 2 illustrates a reduced complexity symbol timing estimator 10' in which in equation (17), the summation term, $$\overline{\sum_{i=m-L+1}^{m} d_i g(t-iT+\tau)} \quad (18)$$

is precalculated and stored in a lookup table 20. This summation term depends only on the last L output symbols of the Viterbi decoder. The values are precomputed and are stored in the lookup table 20 having a size $M^L$.

A multiplier 21 then multiplies the output of the lookup table 20 with the output $Q_{p,s}$ of the CPM detector 11. The output of the multiplier 21 is filtered by the low pass filter 13 and controls the phase of the VCO 14 output to produce the symbol timing reference signal τ.

Figure 3:
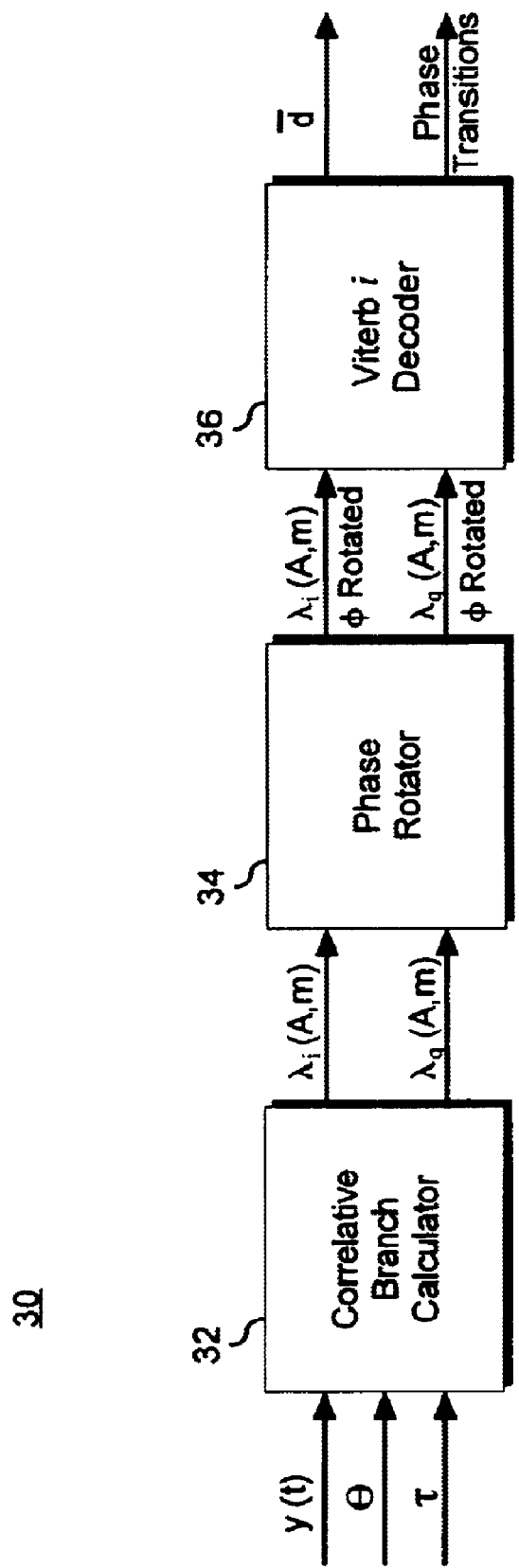
FIG. 3 is a simplified block diagram of a maximum likelihood phase tracking synchronizer demodulator which includes a Viterbi decoder.

FIG. 3 illustrates a CPM receiver 30 which uses a Viterbi algorithm to perform sequence detection on a received symbol sequence in a CPM signal. The CPM receiver computes the branch metric signals required in the Viterbi algorithm, which requires an accurate estimate of the phase of the transmitter's symbol clock signal with respect to the received signal, which is termed symbol timing epoch synchronization. The CPM receiver 30 uses a Viterbi trellis (termed trellis because it looks like an interweaved trellis) decoder or demodulator 36 to demodulate the CPM signals. The decoder 36 represents, by nodes, the possible states of the shift registers of the modulator, and by lines joining the nodes, the possible paths by which transitions between states can be made. The decoder 36 computes a distinct branch metric signal for each branch of the trellis, which is representative of the likelihood that that branch is in a modulator path. The decoder 36 uses the computed branch metric signals to select one path through the trellis having the highest probability of representing the CPM modulated data signal.

Referring to FIG. 3, a received input signal y(t) is applied to a first input port of a correlative branch calculator 32. An estimated transmitter phase reference θ from phase estimator 18 and an estimated symbol timing signal τ from VCO 14 are applied to second and third input ports of the calculator 32, which calculates and produces output signals $\lambda_i$ (A,m) and $\lambda_q$ (A,m) according to equation (10). The calculated signals $\lambda_i$ (A,m) and $\lambda_q$ (A,m) are applied to a phase rotator 34 which rotates the phase thereof to produce outputs which are applied to the Viterbi decoder 36. The Viterbi decoder 36 performs the usual determination of the most likely trellis state, and produces an output $\bar{d}$ of the estimated data sequence. The Viterbi decoder 36 also keeps track of the phase transitions occurring in the trellis which are associated with paths leading to each state. A set of these phase transitions are associated with each current state. The Viterbi decoder selects the most likely or most probable state, and also outputs an associated set of phase transitions.

The present invention departs from a conventional CPM receiver by phase shifting the computed branch metric signals by $\pi/2$, to thereby generate phase shifted branch metric signals associated with each path. At each symbol interval, a symbol timing estimator selects the associated phase shifted branch metric signal for that one path having the highest probability. The symbol timing estimator multiplies the selected phase shifted branch metric signal by a term representative of a summation of a plurality of weighted frequency pulses, and uses the resultant product to produce a symbol timing reference signal $\tau$, which the CPM detector uses to adjust the timing epoch.

The embodiment of FIGS. 1 and 2 are related and merely use different signals which are generated and already computed in the CPM detector.

The embodiment of FIG. 1 takes the computed data vector signal $\bar{d}$ of the CPM detector, and uses the symbol timing reference output signal $\tau$ and the estimated phase $\theta$ of the transmitter symbol clock signal to produce a highest probability brand metric signal s(t), which is then 90° phase shifted to produce js(t), one input to multiplier 12. The transmitted signal frequency estimator uses the same two input signals of $\bar{d}$ and $\tau$ to produce g(t). The multiplier 12 then multiplies the input signal y(t) by each of the two signals js(t) and g(t), and the product controls the frequency of VCO 14 which produces the symbol timing reference signal $\tau$, which is an input to the CPM detector 11.

The embodiment of FIG. 2 uses two signals which are computed by the CPM detector, the data vector signal $\bar{d}$, and Qps which is merely the selected highest probability branch metric signal js(t) multiplied by the CPM input signal y(t). the data signal $\bar{d}$ is input to a lookup data table 2, which then provides g(t), the transmit frequency signal g(t), which is multiplied by multiplier 21 with Qps=js(t)x y(t), to produce an output signal which controls the VCO to produce the symbol timing estimator signal $\tau$.

Both embodiments are related by performing a similar multiplication of the input signal y(t), the transmit frequency signal g(t), and the phase-shifted highest probability signal js(t).

The assumption that the summation of the frequency pulses is constant over a symbol interval will in general cause a degradation of the estimator with respect to the maximum likelihood estimator. Simulations have shown that the degradation is modest for many types of CPM modulations.

While several embodiments and variations of the present invention for a simplified symbol timing tracking circuit for a CPM modulated signal are described in detail herein, it should be apparent that the disclosure and teachings of the present invention will suggest many alternative designs to those skilled in the art.

What is claimed is:

1. A method for establishing a symbol timing epoch reference for demodulating a CPM input data signal received from a CPM transmitter modulated onto a carrier, comprising the steps of:

trellis demodulating the received CPM input data signal by computing trellis branch metric signals using estimates of the phase of the transmitter phase clock relative to the CPM input data signal and a transmitter symbol timing reference signal;

using the computed branch metric signals to select a path signal through the trellis having the highest probability of representing the CPM input data signal;

using the selected path signal to obtain an estimate of the transmitter frequency signal;

using the selected path signal to obtain an estimate of a product of the phase shifted transmitter signal and the CPM input data signal;

calculating the product of the transmitter frequency signal and the product of the phase shifted transmitter signal and the CPM data signal to obtain a timing epoch estimation error signal;

using the timing epoch estimation error signal to adjust the symbol timing epoch reference.

2. The method of claim 1, wherein the step of using the selected path signal to obtain an estimate of the transmitter frequency signal includes computing a summation of a plurality of weighted frequency pulses.

3. The method of claim 1, wherein the step of using the selected path signal to obtain an estimate of the transmitter frequency signal includes using a lookup table which stores a summation of a plurality of weighted frequency pulses.

4. The method of claim 1, wherein the step of using the selected path signal to obtain an estimate of a product of the phase shifted transmitter signal and the CPM input data signal comprises the steps of:

using the selected path signal and estimates of the phase of the transmitter phase clock relative to the CPM input data signal and the transmitter symbol timing reference signal to compute a regenerated transmit signal;

phase shifting the regenerated transmit signal;

multiplying the phase-shifted regenerated transmit signal by the CPM input data signal to obtain the estimate of a product of the phase shifted transmitter signal and the CPM input data.

5. The method of claim 1, wherein the step of using the selected path signal to obtain an estimate of a product of the phase shifted transmitter signal and the CPM input data signal, comprises the steps of:

selecting the computed branch metric signal associated with the path through the trellis having the highest probability;

phase shifting the selected computed branch metric signal to obtain the estimate of a product of the phase shifted transmitter signal and the CPM input data signal.

6. ACPM receiver for receiving a CPM input data signal from a CPM transmitter modulated onto a carrier, comprising:

a CPM detector, including a trellis decoder for demodulating the received CPM input data signal by computing trellis branch metric signals, using estimates of the phase of the transmitter phase clock relative to the CPM input data signal and a transmitter symbol timing reference signal, using the computed branch metric signals to select a path signal through the trellis having the highest probability of representing the CPM input data signal, and using the selected path signal to obtain an estimate of the transmitter frequency signal;

a signal timing estimate for using the selected path signal to obtain an estimate of a product of the phase shifted transmitter signal and the CPM input data signal, calculating the product of the transmitter frequency signal and the product of the phase shifted transmitter signal and the CPM data signal to obtain a timing epoch estimation error signal, and using the timing epoch estimation error signal to adjust the symbol timing epoch reference.

7. The CPM receiver of claim 6, wherein the CPM detector to obtains an estimate of the transmitter frequency signal by computing a summation of a plurality of weighted frequency pulses.

8. The CPM receiver of claim 6, wherein the CPM detector obtains an estimate of the transmitter frequency signal by using a lookup table which stores a summation of a plurality of weighted frequency pulses.

9. The CPM receiver of claim 6, wherein the symbol timing estimator includes:
   means for computing a regenerated transmit signal by using the selected path signal and estimates of the phase of the transmitter phase clock relative to the CPM input data signal and the transmitter symbol timing reference signal;
   a phase shifter for phase shifting the regenerated transmit signal;
   a multiplier for multiplying the phase-shifted regenerated transmit signal by the CPM input data signal to obtain the estimate of a product of the phase shifted transmitter signal and the CPM input data.

10. The CPM receiver of claim 6, wherein the symbol timing estimator includes:
    means for selecting the computed branch metric signal associated with the path through the trellis having the highest probability;
    a phase shifter for phase shifting the selected computed branch metric signal to obtain the estimate of a product of the phase shifted transmitter signal and the CPM input data signal.

11. A circuit for symbol epoch tracking for a CPM receiver comprising:
    a CPM detector for receiving CPM input data signals transmitted to the receiver by a CPM transmitter;
    a phase estimator for proding a transmit clock phase signal coupled to the CPM detector;
    a source of symbol timing estimates coupled to the CPM detector;
    wherein the CPM detector includes,
    (i) a trellis demodulator coupled to said phase estimator and to said source of symbol timing estimate, for demodulating the CPM input data signals using said transmit clock phase signal and said symbol timing estimates, by calculating branch metric signals representative of a likelihood that each trellis branch was in a modulator path of the CPM transmitter,
    (ii) a phase shifter for phase shifting said branch metric signals by $\pi/2$ to produce phase shifted branch metric signals associated with each trellis branch, and
    (iii) a decoder using said branch metric signals to select the path through the trellis having the highest probability, and at each symbol interval, selecting the associated phase shifted branch metric;
    a lookup table, storing a plurality of values of a summation term, coupled to a first vector output of the CPM detector;
    a multiplier for multiplying a first input from the lookup table by a second input from the CPM detector which is a selected phase shifted branch metric signal multiplied by the CPM input data signal;
    an adjustment means coupled to said multiplier to provide a source of symbol timing estimates to said CPM detector.

12. A circuit according to claim 11, where said adjustment means comprise a voltage controlled oscillator.

13. A circuit according to claim 12, where said adjustment means comprise a smoothing means, such as a low pass filter, coupled between said multiplier and said voltage controlled oscillator.

* * * * *